US011667296B2

United States Patent
Laruelo et al.

(10) Patent No.: US 11,667,296 B2
(45) Date of Patent: Jun. 6, 2023

(54) DETERMINATION OF A COEFFICIENT OF FRICTION FOR A VEHICLE ON A ROAD

(71) Applicant: Continental Automotive GmbH, Hannover (DE)

(72) Inventors: Andrea Laruelo, Toulouse (FR); David Guerrero, Toulouse (FR)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/774,652

(22) PCT Filed: Nov. 4, 2020

(86) PCT No.: PCT/EP2020/080869
§ 371 (c)(1),
(2) Date: May 5, 2022

(87) PCT Pub. No.: WO2021/094148
PCT Pub. Date: May 20, 2021

(65) Prior Publication Data
US 2022/0388516 A1    Dec. 8, 2022

(30) Foreign Application Priority Data
Nov. 14, 2019    (FR) .................................... 1912699

(51) Int. Cl.
*B60W 40/068*        (2012.01)
*G01N 19/02*         (2006.01)

(52) U.S. Cl.
CPC ........... *B60W 40/068* (2013.01); *G01N 19/02* (2013.01); *B60W 2552/40* (2020.02);
(Continued)

(58) Field of Classification Search
CPC ........... B60T 2210/12; B60T 2210/124; B60T 2210/122; B60T 2240/02; B60T 2240/03; G01N 19/02
See application file for complete search history.

(56) References Cited

U.S. PATENT DOCUMENTS

| | | | | |
|---|---|---|---|---|
| 5,944,392 A | * | 8/1999 | Tachihata | ................ B60T 8/172 303/112 |
| 7,646,195 B2 | * | 1/2010 | Salfelner | ............. B60C 23/0408 324/160 |

(Continued)

FOREIGN PATENT DOCUMENTS

| | | | | |
|---|---|---|---|---|
| CN | 109383510 A | * | 2/2019 | ............. B60T 8/175 |
| DE | 102013222634 A1 | | 5/2015 | |

(Continued)

OTHER PUBLICATIONS

English Translation of the Written Opinion for International Application No. PCT/EP2020/080869, dated Feb. 9, 2021, 6 pages.

(Continued)

*Primary Examiner* — David A. Rogers
(74) *Attorney, Agent, or Firm* — RatnerPrestia

(57) ABSTRACT

A method for processing friction data for vehicle tires on road segments, implemented by a processing system including at least one computer and an interface for remote communication with a plurality of vehicles, the method including: acquiring, from the plurality of vehicles, friction data for tires of the vehicles on a plurality of road segments, each friction datum including at least: a maximum coefficient of friction available to the vehicle on the road segment, and information relating to the road segment; establishing, for each road segment, a distribution of the friction data obtained from the plurality of vehicles for the road segment; and determining a plurality of road types, each road type comprising a set of road segments, from a measurement of similarity between the distributions of friction data obtained for each road segment.

15 Claims, 4 Drawing Sheets

(52) U.S. Cl.
CPC ..... *B60W 2555/20* (2020.02); *B60W 2556/45* (2020.02); *B60W 2756/10* (2020.02)

(56) References Cited

U.S. PATENT DOCUMENTS

| | | | | |
|---|---|---|---|---|
| 7,739,023 | B2 * | 6/2010 | Lee | B60W 30/16 |
| | | | | 180/170 |
| 8,666,562 | B2 * | 3/2014 | Tuononen | B60T 8/172 |
| | | | | 701/1 |
| 9,156,447 | B2 * | 10/2015 | Zagorski | B62D 6/006 |
| 9,903,728 | B2 * | 2/2018 | Powers | G08G 1/0129 |
| 10,144,433 | B2 * | 12/2018 | Jonasson | B60W 40/068 |
| 10,442,439 | B1 * | 10/2019 | Seo | B60W 40/068 |
| 10,569,752 | B2 * | 2/2020 | Tagesson | B60W 10/188 |
| 10,614,726 | B2 * | 4/2020 | Harkness | G09B 7/00 |
| 10,766,469 | B2 * | 9/2020 | Takae | B60T 8/17616 |
| 11,235,785 | B2 * | 2/2022 | Pazhayampallil | B60W 40/068 |
| 11,292,308 | B2 * | 4/2022 | Nasu | G07C 5/08 |
| 11,318,947 | B2 * | 5/2022 | Hassel | B60W 30/182 |
| 11,427,223 | B2 * | 8/2022 | Poeppel | B60W 60/00184 |
| 11,535,259 | B2 * | 12/2022 | Lellmann | B60W 30/00 |
| 11,543,343 | B2 * | 1/2023 | Yang | G08G 1/096716 |
| 2011/0264300 | A1 | 10/2011 | Tuononen | |
| 2016/0133131 | A1 | 5/2016 | Grimm et al. | |
| 2016/0159365 | A1 | 6/2016 | Singh | |
| 2018/0059667 | A1 * | 3/2018 | Kuroda | B60W 40/076 |
| 2018/0217050 | A1 * | 8/2018 | Heil | B60T 8/172 |
| 2019/0047527 | A1 * | 2/2019 | Falconer | B60W 10/06 |
| 2020/0079381 | A1 * | 3/2020 | Lombrozo | B62D 6/003 |
| 2020/0086880 | A1 * | 3/2020 | Poeppel | G06F 9/542 |
| 2020/0339130 | A1 * | 10/2020 | Piriou | B60T 8/17636 |
| 2021/0001861 | A1 * | 1/2021 | Lobey | B60W 40/068 |
| 2021/0316758 | A1 * | 10/2021 | Oboril | B60W 50/0097 |
| 2022/0234590 | A1 * | 7/2022 | Laruelo | B60W 40/064 |

FOREIGN PATENT DOCUMENTS

| | | | | |
|---|---|---|---|---|
| DE | 102017214026 | A1 | 2/2019 | |
| DE | 102017222568 | A1 * | 6/2019 | B60T 8/171 |
| DE | 102017222812 | A1 | 6/2019 | |
| EP | 2335046 | B1 * | 6/2017 | B60T 8/172 |
| EP | 3206411 | A1 | 8/2017 | |
| JP | 5642682 | B2 * | 12/2014 | B60T 8/172 |
| WO | 2010031905 | A1 | 3/2010 | |
| WO | WO-2010134824 | A1 * | 11/2010 | B60T 8/172 |

OTHER PUBLICATIONS

Andrieux et al., "New Results on the Relation Between Tire-Road Longitudinal Stiffness and Maximum Available Grip for Motor Car", Vehicle, System Dynamics, 2010, vol. 00, No. 4, 24 pages.
Kim et al., "A Comparative Study of Estimating Road Surface Condition Using Support Vector Machine and Deep Neural Network", 2019 IEEE intelligent Transportation Systems Conference (ITSC), Oct. 27-30, 2019, 6 pages.
Acosta, "Road Friction Virtual Sensing: A Review of Estimation Techniques with Emphasis on Low Excitation Approaches", Applied Sciences, 2017, vol. 7, 1230, 47 pages.
Boyraz, "Intelligent Traction Control in Electric Vehicles Using an Acoustic Approach for Online Estimation of Road-Tire Friction", 2013 IEEE Intelligent Vehicles Symposium (IV), Jun. 23-26, 2013, pp. 1336-1343.
Khaleghian et al., "A Technical Survey On Tire-Road Friction Estimation", Friction, 2017, vol. 5, No. 2, pp. 123-146.
Pu et al., "Time-Aware Gated Recurrent Unit Networks for Road Surface Friction Prediction Using Historical Data", ARXIV.Org, Cornell Unmiversity Library, 201 Olin Library Cornell, 2019, 9 pages.
International Search Report and Written Opinion for International Application No. PCT/EP2020/080869, dated Feb. 9, 2021, 9 pages.
International Search Report and Written Opinion for International Application No. PCT/EP2020/080869, dated Feb. 9, 2021, 15 pages (French).

* cited by examiner

DETERMINATION OF A COEFFICIENT OF FRICTION FOR A VEHICLE ON A ROAD

CROSS REFERENCE TO RELATED APPLICATIONS

This application is the U.S. National Phase Application of PCT International Application No. PCT/EP2020/080869, filed Nov. 4, 2020, which claims priority to French Patent Application No. 1912699, filed Nov. 14, 2019, the contents of such applications being incorporated by reference herein.

FIELD OF THE INVENTION

The present invention relates to the field of tire friction on the road and more particularly to the processing of friction data to provide a maximum coefficient of friction to a vehicle traveling on a road.

BACKGROUND OF THE INVENTION

The coefficient of friction of vehicle tires represents the resistance to movement that occurs between the contact surface of the tires on the ground and the ground itself.

This significantly effects the stability and maneuverability of the vehicle. For example, when the coefficient of friction of a given ground for a given vehicle is low, the braking distance of said vehicle will be greater than for the same vehicle on another ground with a higher given coefficient of friction. In this case, the coefficient of friction will represent the resistance between the tire and the road.

Knowing the coefficient of friction is therefore advantageous in vehicle control and particularly in the case of self-driving cars. Specifically, this coefficient of friction may be used, for example, by the vehicle's safety systems such as the ABS or ESP. Taking it into account undoubtedly improves the vehicle's roadholding and, by extension, passenger safety.

In reality, it is difficult to estimate this coefficient since it can be measured precisely only in situations that require significant levels of dynamic excitation such as sudden braking, strong acceleration or a turn, for example. In conventional traffic conditions, it is therefore complicated to obtain quality information on the coefficient of friction, especially as it varies according to various factors and as not all cars are equipped to measure friction.

A large number of onboard methods have been proposed for estimating the friction potential of tires on the road in the vehicle. Among these, solutions based on available CAN bus data are particularly relevant by virtue of the low cost and feasibility of implementation thereof. However, these approaches struggle to provide reliable estimates of the coefficient of friction under everyday and regular driving conditions. Solutions using additional sensors have also been proposed. Some examples are the use of microphones or accelerometers fitted close to or inside the tire. However, these solutions require the use of sensors that are not part of the standard vehicle equipment. In addition, most of them rely on learning models to translate the value measured by the sensor (acceleration for the accelerometer, for example) into a coefficient of friction value more reliably. However, when the sensor measures a value not anticipated by the model's learning conditions, the estimate of the corresponding coefficient of friction is skewed. In general, with or without a learning model, these solutions represent an unwanted additional cost on the vehicle.

More recently, methods based on the processing of a large amount of vehicle friction data have been proposed. They assign to road segments a coefficient of friction which is an average value of the coefficients of friction collected by a set of vehicles on a road segment. These methods therefore do not allow a coefficient of friction to be accurately estimated for a particular vehicle.

As mentioned above, the coefficient of friction is multifactorial and, in particular, it depends significantly on the vehicle that uses the road and more particularly on its tires. A state of wear of the vehicle's tires may substantially decrease the value of the coefficient of friction. There is thus a need to calculate a coefficient of friction in a straightforward, continuous, and inexpensive manner, and above all in a manner that is specific to each vehicle.

SUMMARY OF THE INVENTION

An aim of an aspect of the invention is therefore to overcome, at least in part, the problems set out above.

In particular, one aspect of the invention is to propose a method that makes it possible to characterize road types as a function of coefficient of friction values.

Another aspect of the invention is to make it possible to determine a vehicle's coefficient of friction that is specific to the vehicle and to the road type traveled by the vehicle.

To that end, an aspect of the invention proposes a method for processing friction data for vehicle tires on road segments, implemented by a processing system comprising at least one computer and an interface for remote communication with a plurality of vehicles, the method comprising:
acquiring, from the plurality of vehicles, friction data for tires of the vehicles on a plurality of road segments, each friction datum comprising at least:
a maximum coefficient of friction available to the vehicle on the road segment, and
information relating to the road segment,
establishing, for each road segment, a distribution of the friction data obtained from the plurality of vehicles for said road segment, and
determining a plurality of road types, each road type comprising a set of road segments, from a measurement of similarity between the distributions of friction data obtained for each road segment.

Advantageously, the method for processing data comprises receiving data relating to weather conditions when acquiring the friction data and establishing, for each road segment, a distribution of friction data for each of a plurality of weather conditions.

Advantageously, the method for processing data comprises receiving data relating to weather conditions when acquiring the friction data and establishing, for each road segment, a distribution of friction data for each of a plurality of weather conditions.

According to one embodiment, the method for processing data further comprises characterizing each road segment by identifying, for each road segment, at least one range of values of the friction data in which the relative density of occurrence of the friction data acquired for this road segment is higher than a determined threshold, and the measurement of similarity between the distributions of the friction data is implemented over the ranges of values of friction data identified for the road segments.

Advantageously, the method for processing data comprises, for each of a plurality of predefined vehicle types, determining a local frictional behavior of the vehicle type for each road type, respectively, and each frictional behavior being determined for a predefined vehicle type, from the local frictional behaviors of the vehicle type for each of the plurality of road types.

According to one embodiment, the method for processing data further comprises storing, in a memory, an identification of each determined road type and, for each road type, an identification of all of the road segments belonging to said road type.

Advantageously, the frictional behaviors of determined vehicles are also stored in the memory.

An aspect of the invention also relates to a method for estimating a coefficient of friction, implemented by a system comprising a computer, a remote communication interface and a memory, in which the memory stores:
an identification of each of a plurality of road segments,
a definition of a set of road types, each road type comprising at least one of the plurality of road segments, and
a definition of a plurality of vehicle frictional behaviors, where each frictional behavior is defined by a range of values of maximum coefficients of friction that is associated with each road type,
the method comprising the steps of:
receiving, from a vehicle, at least one item of information on the current location of the vehicle, and at least one additional item of information relating to the vehicle,
determining, from the information received from the vehicle, of a frictional behavior to which the vehicle belongs and of a road type on which the vehicle is located, and
sending, to the vehicle, at least one value of a maximum coefficient of friction available to the vehicle, determined from the determined frictional behavior and the determined road type.

According to one embodiment, each frictional behavior is further defined for a determined weather condition, in which the information received from the vehicle is timestamped, and the method for estimating a coefficient of friction further comprises determining a weather condition associated with said received information, and the frictional behavior to which the vehicle belongs is determined according to said weather condition.

Advantageously, the additional item of information relating to the vehicle comprises at least one value of an available maximum coefficient of friction and an item of information on the location of the vehicle associated therewith.

According to one embodiment, the frictional behaviors stored in the memory are defined, respectively, for each of a plurality of vehicle types, and the additional item of information relating to the vehicle comprises a datum identifying the type of the vehicle.

Furthermore, an aspect of the invention also relates to a computer program product comprising code instructions for implementing the methods for processing data and for estimating a coefficient of friction when they are implemented by a computer.

It further takes the form of a processing system comprising a computer, a remote communication interface and a memory, suitable for implementing the methods for processing data and for estimating a coefficient of friction.

An aspect of the invention therefore proposes a method for processing tire friction data with the aim of creating frictional behaviors characteristic of various vehicles on various road types. Using these behaviors, an aspect of the invention also proposes a method that makes it possible to estimate a coefficient of friction for a vehicle on a road.

Thus, the estimation of the coefficient of friction according to an aspect of the invention is continuous, more reliable, less costly and adapted to each vehicle even if the vehicle is not capable of measuring its friction. It is based on an innovative method allowing the concept of frictional behavior for a vehicle on the road to be made apparent.

BRIEF DESCRIPTION OF THE DRAWINGS

Other features, details and advantages will become apparent from reading the following detailed description and from examining the appended drawings, in which.

DETAILED DESCRIPTION OF THE PREFERRED EMBODIMENTS

Figure 1:
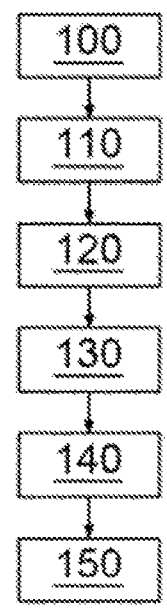
FIG. 1 shows a method for processing friction data according to one embodiment.
Figure 2:
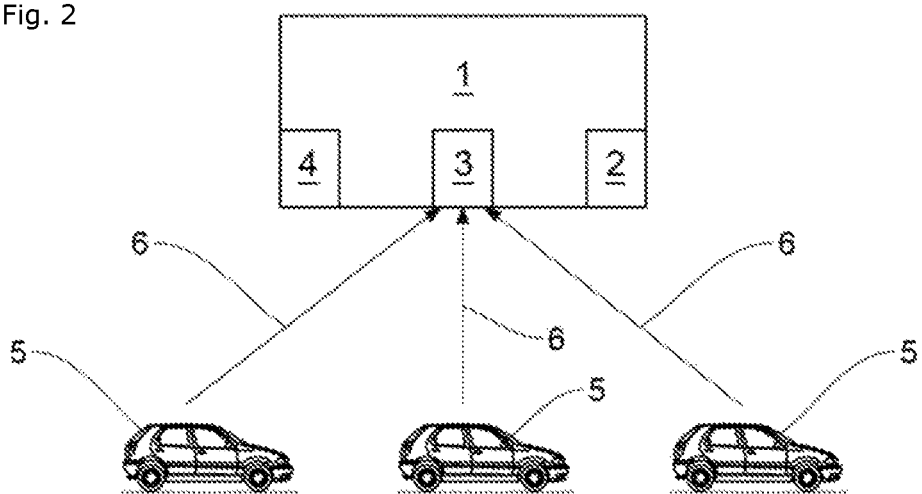
FIG. 2 shows a system for acquiring friction data according to one embodiment.

Reference is now made to FIG. 1 and FIG. 2. They represent, respectively, a method for processing friction data for a plurality of vehicles acquired on a plurality of road segments, and a system for acquiring friction data on the plurality of road segments and processing said data. This processing firstly makes it possible to determine road types according to the friction data for the vehicles.

This method is implemented by a processing system 1 comprising a computer 2, a memory 4 and an interface 3 for remote communication with a plurality of vehicles 5. The computer 2 may, for example, be a processor, a microprocessor or a microcontroller. The memory 4 comprises the code instructions executed by the computer 2. The remote communication interface 3 communicates via a telecommunication network such as Wi-Fi, 3G, 4G, LTE, Bluetooth, etc. The plurality of vehicles 5 is thus able to communicate with the remote communication interface 3 of the processing system 1. Furthermore, the plurality of vehicles 5 is also capable of measuring the dynamic behavior of its tires, for example by means of the use of additional sensors housed directly in and/or on the tire.

Thus, step 100 of the method, implemented by the computer 2, comprises the acquisition of friction data 6 for tires of vehicles 5 on a plurality of road segments. Each friction datum 6 comprises at least a maximum coefficient of friction available to the vehicle on the road segment, information relating to the road segment and information on the vehicle 5 sending these data. The maximum coefficient of friction available corresponds to the highest coefficient of friction value measured by the vehicle 5 on the road segment in question. Advantageously, in the friction data, an optimum slip value is associated with each maximum coefficient of friction.

The vehicle information comprises at least one unique identifier of the vehicle 5 allowing the processing system 1 to find it among the plurality of vehicles 5. The unique vehicle identifier may, for example, be its VIN (vehicle identification number).

Regarding the information relating to the road segment, it may, for example, comprise the GPS position of the road segment. This GPS position may be a timestamped GPS position.

Each friction datum 6 is thus transmitted to the communication interface 3 of the processing system 1 by the vehicles 5 when they move over road segments and take measurements.

Once the friction data 6 have been collected by the processing system, step 110 comprises establishing, by the computer 2, for each road segment, a distribution of the friction data 6 obtained from the plurality of vehicles 5 for the road segment in question.

Figure 3:
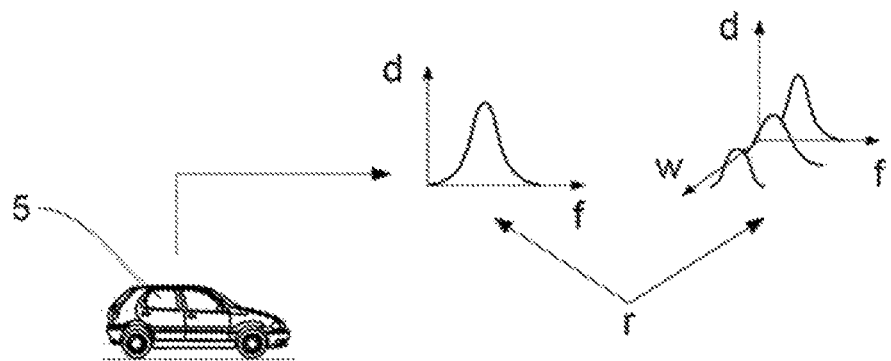
FIG. 3 shows a distribution friction data over a road segment according to a first embodiment.

Thus, according to one embodiment, the friction data 6 comprise only the maximum coefficient of friction and each road segment is represented by a distribution of the maximum coefficients of friction measured by the vehicles 5 that have driven over it, the distribution of the coefficients of friction for each road segment advantageously comprising the number of occurrences corresponding to each maximum coefficient of friction value. An exemplary distribution of friction data comprising only maximum coefficients of friction on a road segment is shown in FIG. 3. Specifically, in this figure, the axis f corresponds to the value of the maximum coefficients of friction and the axis d to the number of occurrences thereof on the road segment r.

Figure 4:
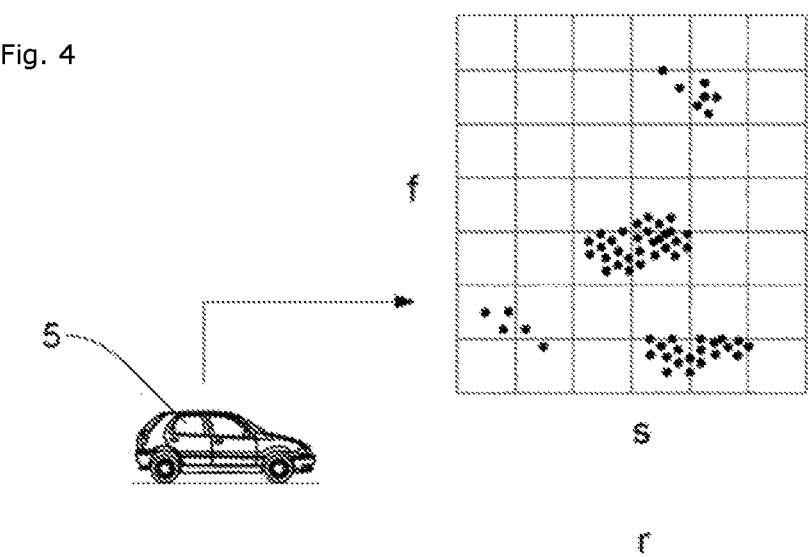
FIG. 4 shows a distribution of friction data over a road segment according to a second embodiment.

Alternatively, when the maximum coefficient of friction is associated with an optimum slip, the friction data are distributed in the maximum coefficient of friction, optimum slip space, i.e. each pair (maximum coefficient of friction, optimum slip) corresponding to a vehicle on the given road segment is represented by a point in this space. An exemplary distribution of friction data according to this embodiment is shown in FIG. 4. The axis f still corresponds to the value of the maximum coefficients of friction and the axis s corresponds to the associated optimum slip thereof on the road segment r.

Advantageously, each friction datum 6 is associated with a weather condition from among a plurality of weather conditions. In other words, when the processing system 1 receives a friction datum 6, it associates therewith the weather condition of the time and place at which the friction datum 6 was measured. For example, if the system 1 receives a friction datum 6 comprising a timestamped GPS position, it is capable of assigning a weather condition to this friction datum 6 since it knows the time and place of the measurement. Thus, it may, for example, query a weather database allowing it to obtain the weather condition corresponding to the time and place at which the vehicle acquired the friction datum. According to another embodiment, the weather condition is received from the vehicle 5 with the friction datum 6 and then assigned to the friction datum 6 by the processing system 1. For example, the plurality of weather conditions comprises the following conditions: dry, wet, very wet, icy, snowy.

Thus, in one embodiment comprising the weather conditions, the computer 2 generates, for each road segment, a plurality of distributions of friction data corresponding to respective weather conditions, each distribution of friction data comprising only the friction data 6 acquired for one and the same weather condition. One example of this embodiment is shown in FIG. 3, where multiple distributions of friction data are shown, each defined for a different weather condition, the latter being represented by the axis w.

Step 120 comprises determining a plurality of road types from the distributions of each road segment, each road type comprising a set of road segments. To do this, the computer 2 measures the similarity between the distributions of each road segment, and groups together those road segments which have similar distributions to form a road type.

According to a first embodiment of this step, in the case where the friction data 6 for the vehicles 5 comprise a maximum coefficient of friction available to the vehicle but no associated optimum slip value, the measurement of similarity between the distributions of the road segments is implemented, for example, on the basis of the average values and the standard deviations of each distribution. Other parameters describing the distributions such as skewness, kurtosis and more complex methods such as the Kolmogorov-Smirnov test may also be used for the measurement of similarity between the distributions.

Figure 5:
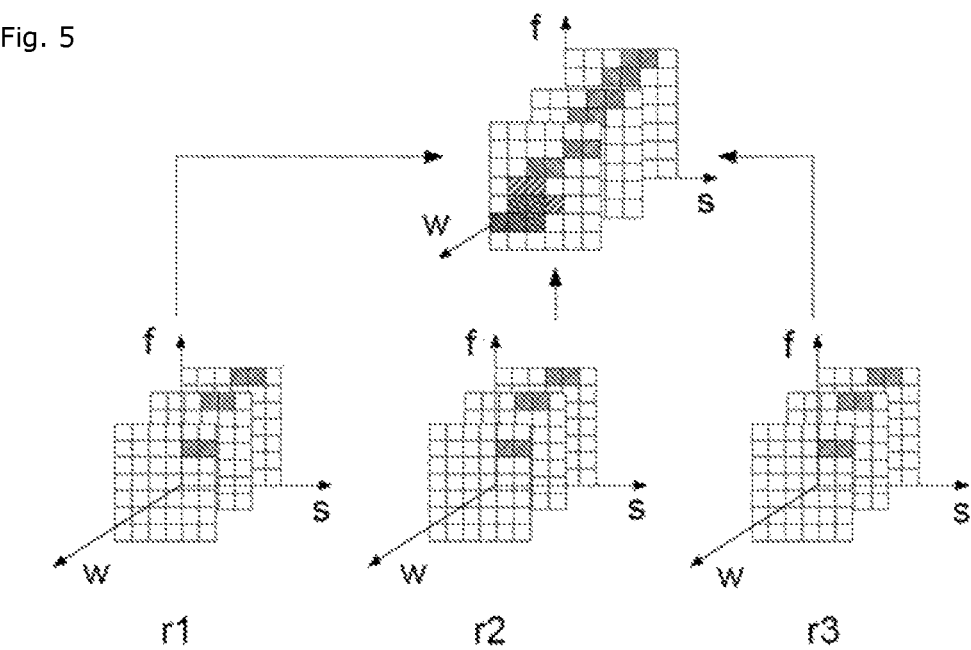
FIG. 5 shows one embodiment for determining a plurality of road types.

With reference to FIG. 5, according to another advantageous embodiment, in the case where the friction data received in step 100 comprise a maximum coefficient of friction available to a vehicle on the road segment and the associated optimum slip value (axes f and s), step 120 is broken down into two steps 121 and 122.

Step 121 comprises characterizing each distribution of each road segment (r1, r2 and r3), by identifying at least one range of friction data values 6 (i.e. maximum coefficient of friction, optimum slip) for which the relative density of occurrence of the friction data 6 is higher than a determined threshold. This step may be implemented by a clustering algorithm based on a density grid for the friction data space, as shown, for example, in FIG. 5. This type of algorithm partitions the friction data space according to a common grid for all of the road segments and then, for each road segment, those grid squares for which the density of occurrence of friction data is higher than the threshold are selected. In FIG. 5, the grid squares shown in black are those for which the occurrence of the friction data 6 is higher than the fixed threshold. Each distribution for each segment is formed by all of the selected grid squares (or ranges of friction data values).

Step 122 then comprises determining the plurality of road types by grouping together the road segments based on the existing similarities between all of the ranges of friction data values selected for each road segment. To do this, each road segment is represented in the form of a graph where each node of the graph represents one of the squares of the grid from the preceding step. The similarity between distributions of road segments may be calculated by an algorithm for calculating similarity between graphs such as graph similarity scoring and matching (Laura A. Zager, George C. Verghese) or fast parallel algorithms for graph similarity and matching (Georgios Kollias, Madan Sathe, Olaf Schenk, Ananth Grama).

In the case in which the weather conditions (axis w) are considered, each of the road segments comprises a plurality of distributions of friction data defined for a plurality of weather conditions but the method remains the same. The measurement of similarity by the computer 2 is then established from all of the distributions of data for each segment.

The method for processing friction data has made it possible to obtain, in the description above, a plurality of road types each grouping together a plurality of road segments. The second part of the processing method described below makes it possible to define a set of frictional behaviors of vehicles for the plurality of road types.

In what follows, the frictional behavior is defined as a set of ranges of values of maximum coefficients of friction associated, respectively, with each road type of the plurality of road types, the frictional behaviors being formulated such that each vehicle corresponds to at least frictional behavior, which makes it possible to deduce a maximum coefficient of friction value for the vehicle on a given road type.

Thus, step 130 of the method comprises defining the set of frictional behaviors of vehicles for the plurality of road types and is presented in two distinct embodiments.

In a first embodiment, the frictional behaviors are defined by identifying a plurality of groups of vehicles 5 having, on each road type of the plurality of road types, similar values of maximum coefficients of friction.

The limits of the range of values of maximum coefficients of friction associated with a road type for a group of vehicles 5 are determined from the values of the maximum coefficients of friction for this road type for the vehicles in the group; for example, they may correspond to the extreme values of these coefficients within the group of vehicles.

The set of ranges of values of maximum coefficients of friction associated with each road type of the plurality of road types for a group of vehicles 5 represents the frictional behavior of the group of vehicles 5.

For each road type, there are a plurality of ranges of maximum coefficients of friction for a group of vehicles 5 when the friction data 6 are associated with a plurality of weather conditions, each range corresponding to a weather condition. Thus, in the frictional behavior for a group of vehicles 5, each range of maximum coefficients of friction is also defined for a weather condition.

In a second embodiment, the frictional behaviors of vehicles are determined from predefined vehicle types. A predefined vehicle type comprises at least one of the following elements and all possible combinations of elements between them: vehicle make, vehicle model, vehicle range (for example, SUV, city car, 4×4, etc.), year vehicle entered into service, unladen weight of the vehicle, laden weight of the vehicle, weight of the vehicle when first setting off, age of the front and rear tires, tire width, tire type (summer, winter, etc.). The following elements are preferred for establishing the vehicle type: vehicle model, weight of the vehicle when first setting off, tire age, tire width, and tire type.

In this embodiment, each vehicle 5 sends vehicle information allowing the processing system to associate said vehicle 5 with a predefined vehicle type.

The vehicle 5 information may comprise the predefined type elements listed above. They may also comprise a unique vehicle identifier, for example the VIN. The unique identifier of the vehicle 5 may allow the processing system 1 to find the predefined type elements of the vehicle 5 when the latter has not sent them thereto by querying a database, for example. Depending on the vehicle type definition, a vehicle 5 may therefore belong to multiple predefined vehicle types and correspond to multiple frictional behaviors.

In this way, the computer 2 identifies, for each of the road types of the plurality of road types, a local frictional behavior for a predefined vehicle type. The local frictional behavior is defined as a range of values of maximum coefficients of friction for the vehicles 5 that belong to a predefined vehicle type on a road type of the plurality of road types. According to one non-limiting example, the limits of the range of values of maximum coefficients of friction for a frictional behavior for a road type may be the extrema of the maximum coefficients of friction for the vehicle 5 of the predefined type on the road type in question. All of the local frictional behaviors associated with a predefined vehicle type on the plurality of road types then forms the frictional behavior for the predefined vehicle type.

Additionally, when the friction data 6 are associated with a weather condition, there are, for each road type, a plurality of ranges of maximum coefficients of friction for a predefined vehicle type. Thus, in the frictional behavior for a predefined vehicle type, each range of maximum coefficients of friction is also defined by a weather condition.

The method for processing data has thus established, in a second part, a set of frictional behaviors for vehicles on the plurality of road types. The third and last part of this method then allows the set of frictional behaviors to be stored in a memory in association with the plurality of road types.

In a step 140, the computer 2 stores, in a memory, an identification of each road type of the plurality of road types and, for each road type, an identification of all of the road segments belonging to said road type. In this way, it is possible to find, from a road segment identifier, the road type to which it belongs. Each road type is therefore associated with the road segments that it comprises in the memory. The memory in question may be the memory 4 containing the code instructions or another memory.

Next, step 150 comprises associating, in the memory, the previously defined vehicle frictional behaviors with the road segments and road types already present in said memory. Two implementations of step 150 are presented below, respectively when the vehicle frictional behaviors have been defined on the basis of vehicle groups or on the basis of predefined vehicle types.

According to a first embodiment, the computer 2 stores, in the memory, the frictional behaviors established for each vehicle group, and the computer 2 thus associates, with each range of values of maximum coefficients of friction for a frictional behavior, the identifer of the road type corresponding to the range of coefficients.

It is therefore possible, from at least one friction value for a vehicle 5 and an item of information on the location of the road segment where this value was measured, to find the frictional behavior of the vehicle 5 over the plurality of road types.

According to a second embodiment, the computer 2 stores, in the memory, each frictional behavior established for each predefined vehicle type, and the computer 2 thus associates, with each range of values of maximum coefficients of friction, the identifier of the road type corresponding to the range of coefficients and an identifier of the predefined vehicle type.

It is therefore possible, from an identifier of a predefined type of a vehicle 5, to find the frictional behavior of the vehicle 5 on the plurality of road types.

In the embodiment where the maximum coefficient of friction value ranges have been defined for a plurality of weather conditions, an identification of the weather condition is also stored in the memory for each value range.

An aspect of the invention also proposes a method for estimating a coefficient of friction. This method is described with reference to FIG. 6 which shows the system 10 in which the method is implemented and to FIG. 7 which shows the steps of which it is composed.

Figure 6:
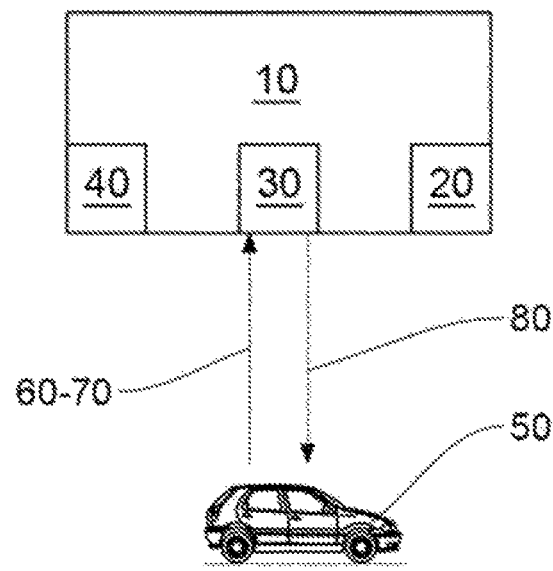
FIG. 6 shows a system for implementing a method for estimating a vehicle's coefficient of friction.

Referring to FIG. 6, a system 10 comprises a computer 20, a remote communication interface 30 and a memory 40, the system being configured to send at least one coefficient of friction value 80 to the vehicle 50. To do this, the memory 40 of the system 10 comprises an identification of each of a plurality of road segments and a definition of a set of road types. Each road type comprises at least one of the plurality of road segments. The memory also stores a plurality of frictional vehicle behaviors, each vehicle frictional behavior being defined by a range of maximum coefficients of friction that is associated with each road type.

Advantageously, the vehicle frictional behaviors may also be defined for a determined weather condition and/or a predefined vehicle type. The predefined vehicle types and the weather conditions comprise the same elements as those presented above in the description of the method for processing friction data. Furthermore, the system 10 may be the same system as that which implemented the method for processing data described above, or another system. Thus, the computer 20 may, for example, be a processor, a microprocessor or a microcontroller. The remote communication interface 3 communicates, for example, via a telecommunication network such as Wi-Fi, 3G, 4G, LTE, Bluetooth, etc.

Figure 7:
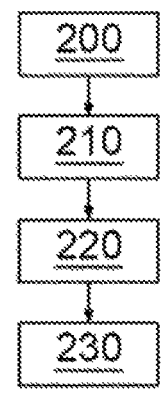
FIG. 7 shows a method for estimating a vehicle's coefficient of friction implemented in the system of FIG. 6.

Thus, with reference to FIG. 7, step 200 of the estimation method comprises receiving, through the communication interface 30 of the system 10, at least one item of information 70 on the current location of the vehicle 50 and at least one additional item of information 60 relating to the vehicle 50.

Advantageously, the item of current location information 70 comprises a GPS position. The GPS position may be timestamped. Additionally, the item of current location information 70 may also comprise a weather condition of the road if the vehicle is capable of determining it.

In a first embodiment, the additional item of information 60 may comprise a maximum coefficient of friction value available associated with an item of location information.

In a second embodiment, the additional item of information 60 comprises information allowing at least one predefined vehicle type to be identified from among a plurality of predefined vehicle types. The additional item of information 60 may comprise a vehicle identification datum, for example its VIN. Alternatively, the additional item of information may comprise one or more of the following items of information relating to the vehicle: vehicle make, vehicle model, vehicle range (for example, SUV, city car, 4×4, etc.), year vehicle entered into service, unladen weight of the vehicle, laden weight of the vehicle, weight of the vehicle when first setting off, age of the front and rear tires, tire width, tire type (summer, winter, etc.).

These items of information 60 and 70 are then used by the system 10 for the remainder of the method to determine the frictional behavior of the vehicle 50 and the road type corresponding to each item of current location information 70.

Specifically, in step 210, the computer 20 determines, from each item of current location information 70 received from the vehicle 50, the road segment corresponding to said item of information 70 on the current location of the vehicle and identifies the road type to which it belongs.

For example, in the case where the item of current location information 70 comprises a GPS position, the system 10 is able to determine to which road segment the GPS position refers using the road segment identifiers contained in the memory 40. It is then able to identify the road type comprising the determined road segment insofar as each road type identifier is associated with the identifiers of the road segments that it comprises in the memory 40.

In one advantageous embodiment, when the GPS position is timestamped, the system 10 is also able to find the weather condition for the road type corresponding to the item of current location information 70 by querying a weather database.

The computer 20 then determines, in a step 230, the frictional behavior of the vehicle 50 from the additional item of information 60.

According to a first embodiment, the vehicle 50 is able to acquire the dynamic behavior of its tires, and an additional item of information 60 which it sends to the communication interface 30 comprises a value of the maximum coefficient of friction available to the vehicle 50 and the GPS position at which it was measured. The system 10 is able to find the road type on which the value was measured, and therefore identify the range of values of maximum coefficients of friction to which it belongs on the road type in question. The range of values of maximum coefficients of friction on the road type in question belongs to a frictional behavior that the system is therefore capable of determining.

According to a second embodiment, the vehicle 50 sends an additional item of information 60 comprising a unique vehicle identifier, for example the VIN of the vehicle 50, to the system 10 via the communication interface 30. The VIN of the vehicle 50 is used by the system 10 to allow it to identify the vehicle 50 with respect to a predefined vehicle type from among the plurality of predefined vehicle types. Specifically, the system 10 is able to find predefined vehicle type elements from the VIN and therefore determine the predefined vehicle type of the vehicle 50. Advantageously, the predefined vehicle type associated by the system 10 with the vehicle 50 combines all of the predefined vehicle type elements extracted from the VIN.

According to a first variant of the second embodiment, the vehicle 50 sends an additional item of information 60 comprising the elements of the predefined vehicle type to which it belongs to the communication interface 30. In this case, the system 10 determines the predefined type of the vehicle 50 from these elements.

In a second variant, the additional item of information 60 comprises both an identifier of the vehicle 50 and of the elements of predefined types of the vehicle 50. In this case, the system 10 extracts the predefined type elements from the identifier of the vehicle 50 and adds them to the other elements sent by the vehicle in order to determine its predefined type.

Thus, in the second embodiment, the system 10 determines the frictional behavior of the vehicle 50 corresponding to the predefined vehicle type that it has determined.

If the frictional behaviors have been established while taking coefficient of friction values for determined weather conditions into account, the item of weather condition information obtained for the vehicle is also used to identify the frictional behavior of the vehicle.

Lastly, in a step 220, the system 10 returns at least one coefficient of friction value 80 to the vehicle 50 corresponding to a maximum coefficient of friction value from the range of values of the frictional behavior associated with the vehicle 50 for the road type corresponding to the item of current location information 70. Having identified the road type corresponding to the item of current location information 70 and having determined the frictional behavior of the vehicle 50, the system 10 returns to the vehicle 50 a value from the range of values of maximum coefficients of friction for the frictional behavior of the vehicle 50 determined for the identified road type. This value may, for example, be an average of the values of the range.

When the system 10 has access to the weather condition of the road type of the item of current location information 70, it returns to the vehicle 50 a value from the range of values of maximum coefficients of friction for the frictional behavior of the vehicle 50 defined for this same weather condition on the identified road type.

The method works in the same way when the vehicle 50 sends multiple items of current location information 70. In this case, if it sends items of location information 70 corresponding to future road segments via which it will travel, the system 10 is capable of estimating a future coefficient of friction for the vehicle 50.

This solution therefore provides a continuous and accurate estimate of road friction conditions that takes the specificities of each vehicle into account. It also takes various weather conditions into account when these are available. In this way, the proposed method is able to adapt to changes that affect all vehicles (weather and roads) and to the respective friction characteristics of each thereof without adding additional sensors.

The invention claimed is:

1. A method for processing friction data for vehicle tires on road segments, implemented by a processing system comprising at least one computer and an interface for remote communication with a plurality of vehicles, the method comprising:
   acquiring, from the plurality of vehicles, friction data for tires of the vehicles on a plurality of road segments, each friction datum comprising at least:
      a maximum coefficient of friction available to the vehicle on the road segment,
      information relating to the road segment, and
      information relating to said vehicles,
   establishing, for each road segment, a distribution of the friction data obtained from the plurality of vehicles for said road segment,
   determining a plurality of road types, each road type comprising a set of road segments, from a measurement of similarity between the distributions of friction data obtained for each road segment,
   determining, from the determined road types and the friction data acquired from the plurality of vehicles, a plurality of vehicle frictional behaviors, each frictional behavior being defined by a range of values of maximum coefficients of friction that is associated with each road type,
   sending, to at least one vehicle of the plurality of vehicles, at least one value of a maximum coefficient of friction available to the at least one vehicle, based on a determined frictional behavior from the plurality of vehicle frictional behaviors and a determined road type from the plurality of road types, and
   using the at least one value of the maximum coefficient of friction by safety systems of the at least one vehicle, wherein the safety systems include Anti-lock braking systems (ABS) or electronic stability program (ESP) systems.

2. The method for processing data as claimed in claim 1, further comprising receiving data relating to weather conditions when acquiring the friction data; and
   establishing, for each road segment, a distribution of friction data for each of a plurality of weather conditions.

3. The method for processing data as claimed in claim 1, wherein the friction data further comprise an optimum slip value associated with the maximum coefficient of friction.

4. The method for processing data as claimed in claim 1, further comprising characterizing each road segment by identifying, for each road segment, at least one range of values of the friction data in which the relative density of occurrence of the friction data acquired for this road segment is higher than a determined threshold, and the measurement of similarity between the distributions of the friction data is implemented over the ranges of values of friction data identified for the road segments.

5. The method for processing data as claimed in claim 1, further comprising storing, in a memory, an identification of each determined road type and, for each road type, an identification of all of the road segments belonging to said road type.

6. The method for processing data as claimed in claim 1, further comprising, for each of a plurality of predefined vehicle types:
   determining a local frictional behavior of the vehicle type for each road type, respectively, and each frictional behavior being determined for a predefined vehicle type, from the local frictional behaviors of the vehicle type for each of the plurality of road types.

7. The method for processing data as claimed in claim 6, further comprising storing, in a memory, an identification of each determined road type and, for each road type, an identification of all of the road segments belonging to said road type; and
   storing, in the memory, the frictional behaviors of determined vehicles.

8. A method for estimating a coefficient of friction, implemented by a system comprising a computer, a remote communication interface, and a memory,
   wherein the memory stores:
      an identification of each of a plurality of road segments,
      a definition of a set of road types, each road type comprising at least one of the plurality of road segments, and
      a definition of a plurality of vehicle frictional behaviors, where each frictional behavior is defined by a range of values of maximum coefficients of friction that is associated with each road type,
   the method comprising:
      receiving, from a vehicle, at least one item of information on the current location of the vehicle, and at least one additional item of information relating to the vehicle,
      determining, from the information received from the vehicle, of a frictional behavior to which the vehicle belongs and of a road type on which the vehicle is located,
      sending, to the vehicle, at least one value of a maximum coefficient of friction available to the vehicle, determined from the determined frictional behavior and the determined road type, and
      using the at least one value of the maximum coefficient of friction by safety systems of the vehicle, wherein the safety systems include Anti-lock braking systems (ABS) or electronic stability program (ESP) systems.

9. The method as claimed in claim 8, wherein each frictional behavior is further defined for a determined weather condition,
   wherein the information received from the vehicle is timestamped, and the method further comprises determining a weather condition associated with said received information, and the frictional behavior to which the vehicle belongs is determined according to said weather condition.

10. The method as claimed in claim 8, wherein the additional item of information relating to the vehicle comprises at least one value of an available maximum coefficient of friction and an item of information on the location of the vehicle associated therewith.

11. The method as claimed in claim 8, wherein the frictional behaviors stored in the memory are defined, respectively, for each of a plurality of vehicle types, and the additional item of information relating to the vehicle comprises a datum identifying the type of the vehicle.

12. A non-transitory computer program product, comprising code instructions for implementing the method as claimed in claim 1, when it is implemented by a computer.

13. A processing system comprising a computer, a remote communication interface and a memory, configured to implement the method as claimed in claim 1.

14. A non-transitory computer program product, comprising code instructions for implementing the method as claimed in claim 11, when it is implemented by a computer.

15. A processing system comprising a computer, a remote communication interface and a memory, configured to implement the method as claimed in claim 11.

* * * * *